United States Patent
Hollis, Jr. et al.

(10) Patent No.: US 9,853,528 B2
(45) Date of Patent: Dec. 26, 2017

(54) SPHERICAL INDUCTION MOTOR

(71) Applicant: Carnegie Mellon University, CTTEC, Pittsburgh, PA (US)

(72) Inventors: Ralph L. Hollis, Jr., Pittsburgh, PA (US); Masaaki Kumagai, Sendai (JP)

(73) Assignee: Carnegie Mellon University, CTTEC, Pittsburgh, PA (US)

( * ) Notice: Subject to any disclaimer, the term of this patent is extended or adjusted under 35 U.S.C. 154(b) by 236 days.

(21) Appl. No.: 14/177,450

(22) Filed: Feb. 11, 2014

(65) Prior Publication Data

US 2014/0191626 A1 Jul. 10, 2014

Related U.S. Application Data

(63) Continuation of application No. PCT/US2012/050326, filed on Aug. 10, 2012.

(60) Provisional application No. 61/574,980, filed on Aug. 12, 2011.

(51) Int. Cl.
*H02K 16/04* (2006.01)
*H02K 41/025* (2006.01)
*H02P 29/00* (2016.01)

(52) U.S. Cl.
CPC ........... *H02K 16/04* (2013.01); *H02K 41/025* (2013.01); *H02P 29/00* (2013.01); *H02K 2201/18* (2013.01)

(58) Field of Classification Search
CPC .... H02K 41/031; H02K 41/025; H02K 16/04; H02K 29/00; H02K 2201/18
USPC ...................................... 310/68 B, 198, 68 R
See application file for complete search history.

(56) References Cited

U.S. PATENT DOCUMENTS

| | | | |
|---|---|---|---|
| 2,856,573 A * | 10/1958 | Williams | H02K 17/30 310/191 |
| 3,537,324 A | 11/1970 | Evans | |
| 4,614,887 A | 9/1986 | Ahner et al. | |
| 4,719,381 A * | 1/1988 | Miles | H02K 41/02 310/166 |
| 4,739,241 A * | 4/1988 | Vachtsevanos | B25J 17/0266 310/166 |
| 4,758,758 A | 7/1988 | Laing | |
| 4,926,122 A * | 5/1990 | Schroeder | G01D 5/147 324/207.13 |
| 4,961,352 A * | 10/1990 | Downer | F16C 32/0438 310/90.5 |
| 5,410,232 A | 4/1995 | Lee | |
| 5,413,010 A * | 5/1995 | Nakanishi | B01F 15/00435 310/156.38 |
| 5,476,018 A | 12/1995 | Nakanishi et al. | |

(Continued)

FOREIGN PATENT DOCUMENTS

RU 2116622 C1 * 7/1998

OTHER PUBLICATIONS

RU 2116622 C1 astract translation Jan. 26, 2016.*
(Continued)

*Primary Examiner* — Joshua Benitez Rosario
*Assistant Examiner* — Leda Pham
(74) *Attorney, Agent, or Firm* — Jones Day

(57) ABSTRACT

Systems and methods are provided for an induction motor. An induction motor includes a spherical rotor and a plurality of curved inductors positioned around the spherical rotor. The plurality of curved inductors are configured to rotate the spherical rotor continuously through arbitrarily large angles among any combination of three independent axes.

34 Claims, 17 Drawing Sheets

(56) References Cited

U.S. PATENT DOCUMENTS

| | | | |
|---|---|---|---|
| 5,798,590 A * | 8/1998 | Sakakibara | H02K 41/031 310/156.19 |
| 2008/0073989 A1* | 3/2008 | Bandera | H02K 7/14 310/80 |
| 2009/0230787 A1 | 9/2009 | Won et al. | |

OTHER PUBLICATIONS

RU 2116622 Cl abstract translation, Dec. 13, 2016.*
International Search Report; PCT/US2012/050326; dated Oct. 16, 2012.
Written Opinion of the International Searching Authority; PCT/US2012/050326; dated Oct. 16, 2012.

* cited by examiner

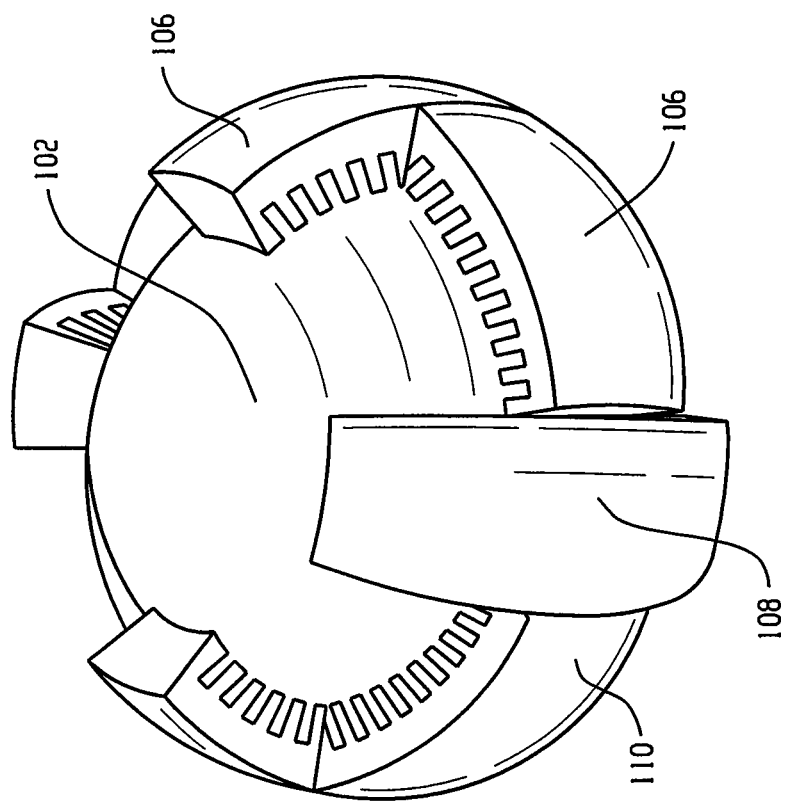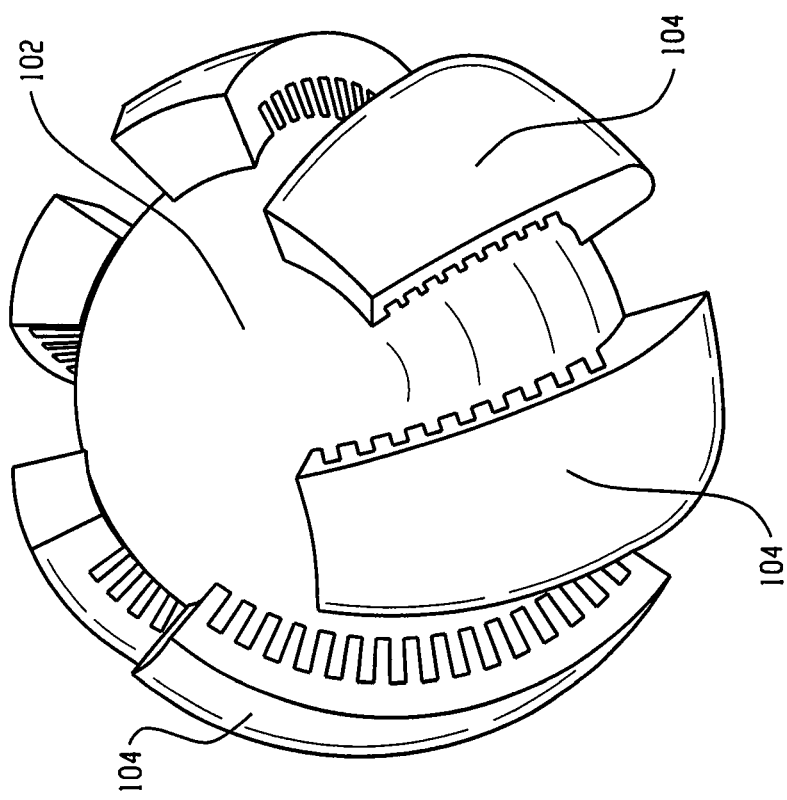
Fig. 1

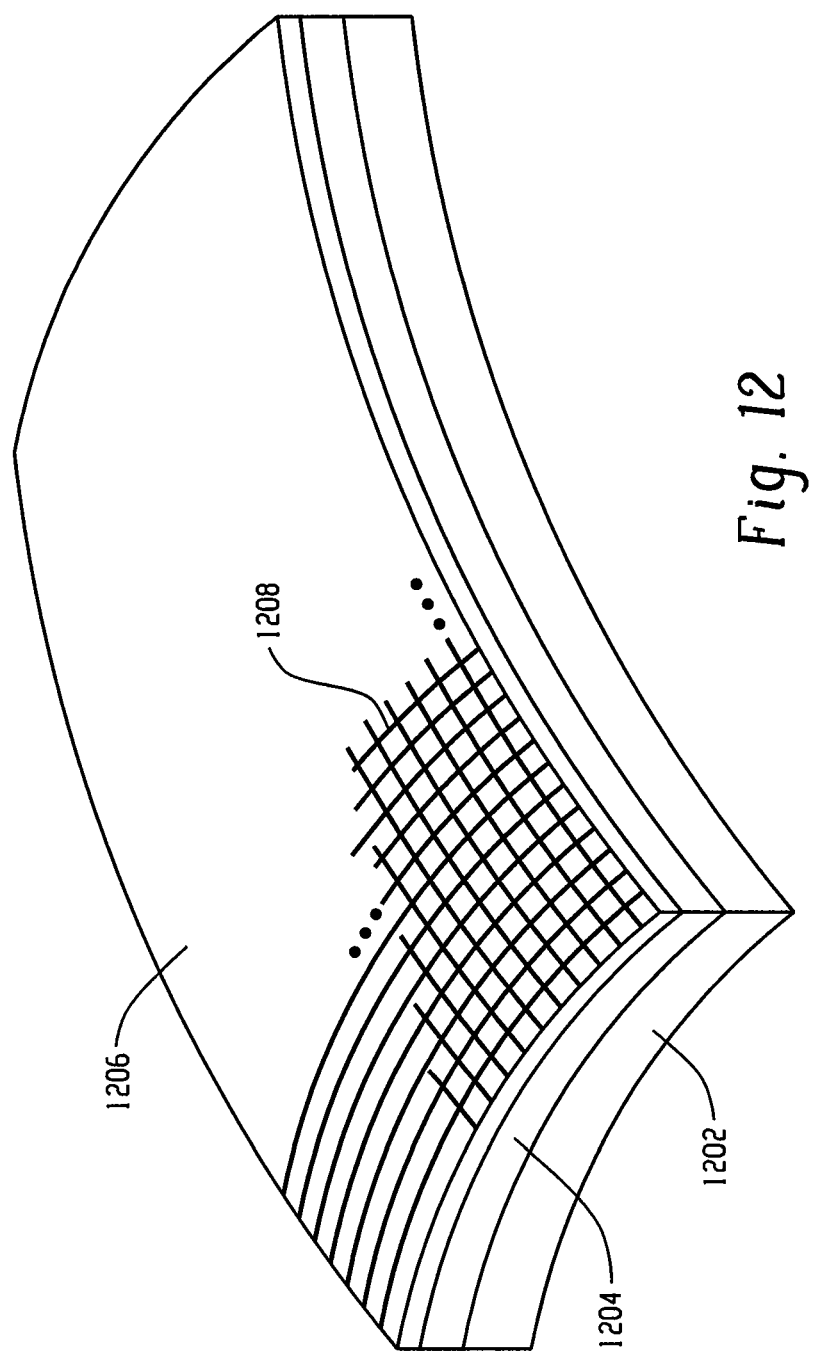

SPHERICAL INDUCTION MOTOR

CROSS-REFERENCE TO RELATED APPLICATIONS

This application is a continuation of PCT Application No. PCT/US2012/050326, filed on Aug. 10, 2012, entitled "Spherical Induction Motor" which claims the benefit of U.S. Provisional Patent Application No. 61/574,980 filed on Aug. 12, 2011, the entire contents of which are incorporated herein by reference.

This application is related to U.S. Pat. No. 7,847,504 filed on Oct. 10, 2007, the entire contents of which are incorporated herein by reference.

TECHNICAL FIELD

This document relates generally to motors and more particularly to spherical induction motors.

BACKGROUND

Spherical motion is associated with many important applications. For example, robotic wrists and shoulder joints and positioning mechanisms for antennas, sensors, detectors, and cameras can all utilize a spherical rotor to facilitate spherical motion and improve performance. Despite these important applications, no motor has previously been designed that can rotate a spherical rotor continuously through arbitrarily large angles among any combination of three independent axes via an induction principle.

SUMMARY

In accordance with the teachings herein, systems and methods are provided for an induction motor. An induction motor includes a spherical rotor and a plurality of curved inductors positioned around the spherical rotor. The plurality of curved inductors are configured to rotate the spherical rotor continuously among any combination of three independent axes.

As another example, a method of rotating a spherical rotor continuously among any combination of three independent axes includes placing the spherical rotor within a plurality of curved inductors, where each of the curved inductors includes a plurality of windings. A magnitude and frequency of electric currents applied to each of the windings of each of the curved inductors is individually varied to induce a travelling magnetic wave in the spherical rotor to rotate the spherical rotor.

BRIEF DESCRIPTION OF THE FIGURES

FIG. 1 depicts two example implementations of a spherical induction motor.

FIG. 12 is a cross-section diagram of a spherical rotor that includes a pattern on the traction or wear layer to improve velocity sensing.

DETAILED DESCRIPTION

A spherical induction motor, as described herein, provides an ability to rotate a spherical rotor continuously through arbitrarily large angles among any combination of three independent axes. FIG. 1 depicts two example implementations of a spherical induction motor. The implementations each include a spherical rotor 102. The spherical rotors 102 are surrounded by a plurality of curved inductors 104, 106, 108, 110. The curved inductors 104, 106, 108, 110 are positioned around their respective spherical rotor 102. The curved inductors 104, 106, 108, 110 are configured to rotate the spherical rotor 102 continuously among any combination of three independent axes. For example, the plurality of inductors can be positioned in a non-degenerate arrangement so as to provide a set of torque axes, enabling rotation of the spherical rotor among any combination of three independent axes. In the left example, the curved inductors 104 are positioned askew relative to one another along or parallel to a great circle of the spherical rotor 102. In the right example, certain of the curved inductors (e.g., curved inductors 108, 110) are positioned orthogonally to one another.

Figure 2:
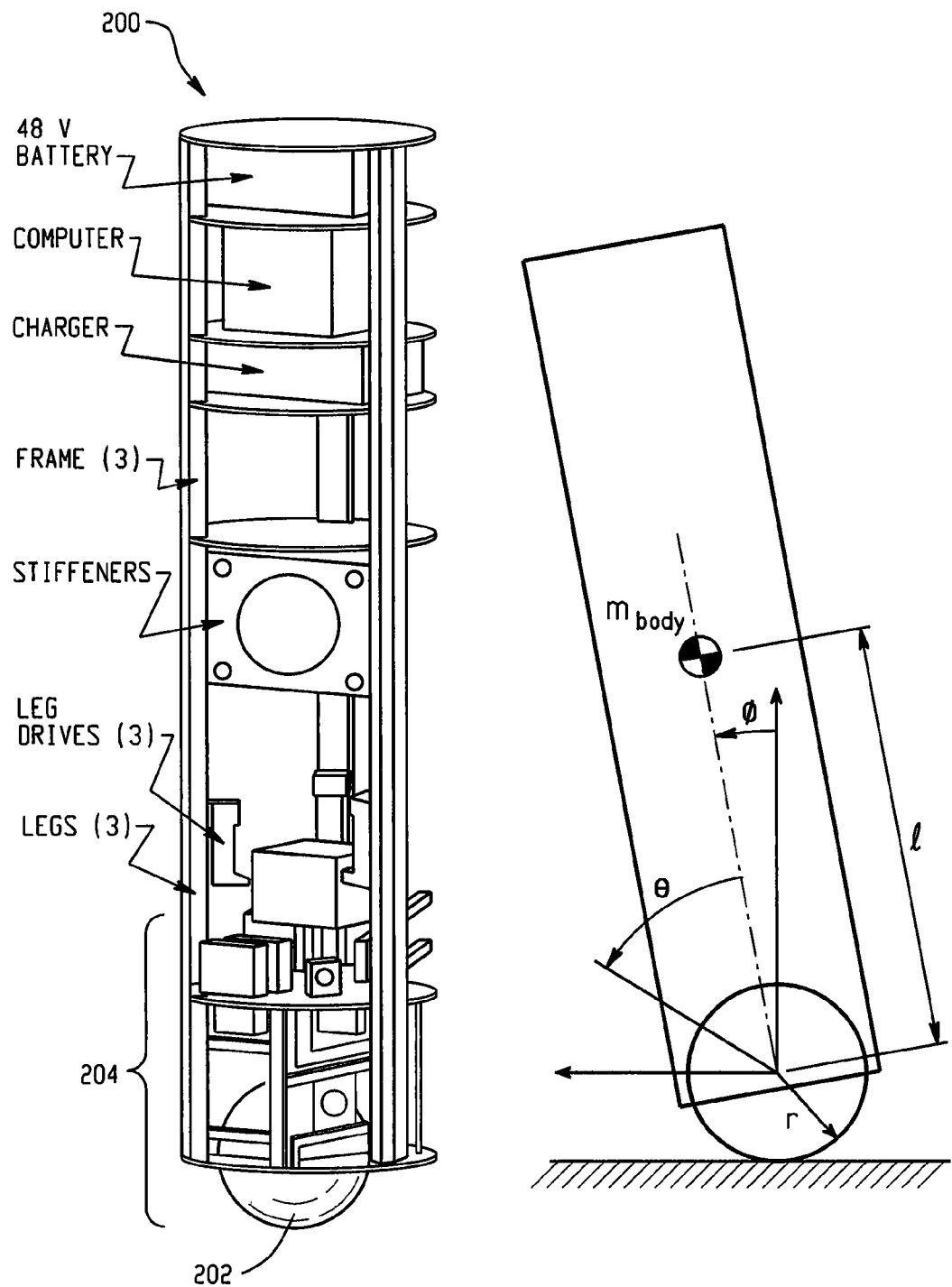
FIG. 2 depicts an application of a spherical induction motor in the form of a dynamic balancing mobile robot.

As noted above, spherical motion has a wide array of applications. FIG. 2 depicts one such application in the form of a dynamic balancing mobile robot (a ballbot). A ballbot 200 is a robot that is tall enough to interact with people at a reasonable height and is slender enough to maneuver about an area without colliding with things or people. The ballbot 200 balances on a single spherical rotor that is controlled via a drive unit 204 in the form of a spherical induction motor. The drive unit 204 imparts inductive forces on the spherical rotor 202 to cause controlled rotation of the spherical rotor 202 to maintain the balance and stability of the ballbot, even when the ballbot is pushed by an outside force.

Figure 3:
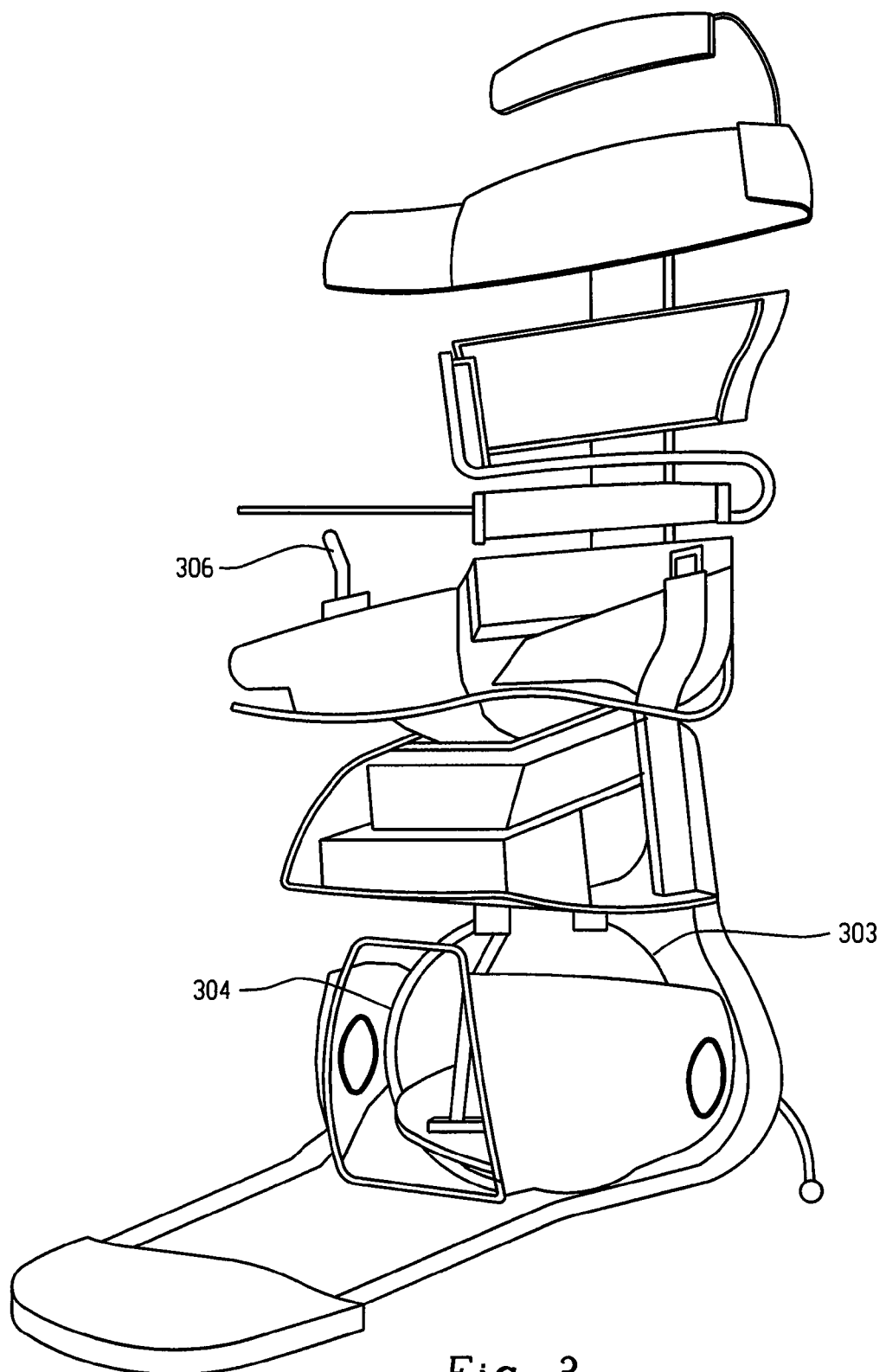
FIG. 3 depicts another implementation of a spherical induction motor in the form of a motorized wheel chair.

FIG. 3 depicts another application of a spherical induction motor in the form of a motorized wheel chair. In this application, a spherical rotor 302 is controlled via a spherical induction motor 304 according to commands received from a joystick 306. The spherical induction motor 304 may monitor the current rotational velocity of the spherical rotor 302 and the current directional command from the joystick 306 to determine an appropriate inductive force to apply to the spherical rotor 302 to maintain appropriate motion.

Figure 4:
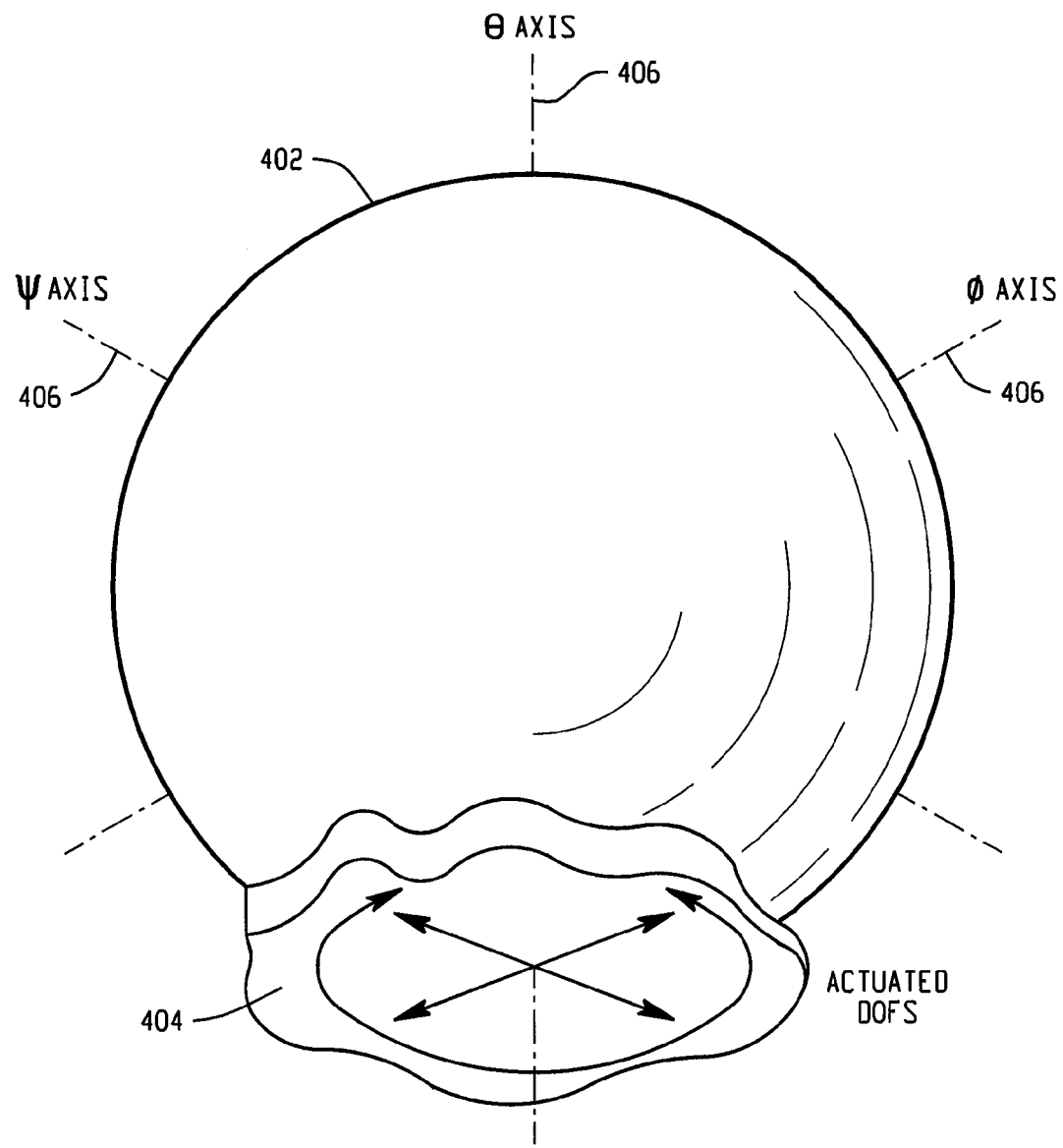
FIG. 4 is a diagram depicting a spherical rotor transmitting forces and torques to a surface on which the rotor sits.

FIG. 4 is a diagram depicting a spherical rotor transmitting forces and torques to a surface on which the rotor sits. As the spherical rotor 402 sits on the surface 404, the spherical rotor 402 can be rotated among any of the three depicted independent axes 406. Such rotations impart a force and/or torque to the floor 404, enabling translation and/or rotation motion of the spherical rotor 402, and any apparatus connected to or carried by the spherical rotor 402, with respect to the floor surface 404.

Figure 5A:
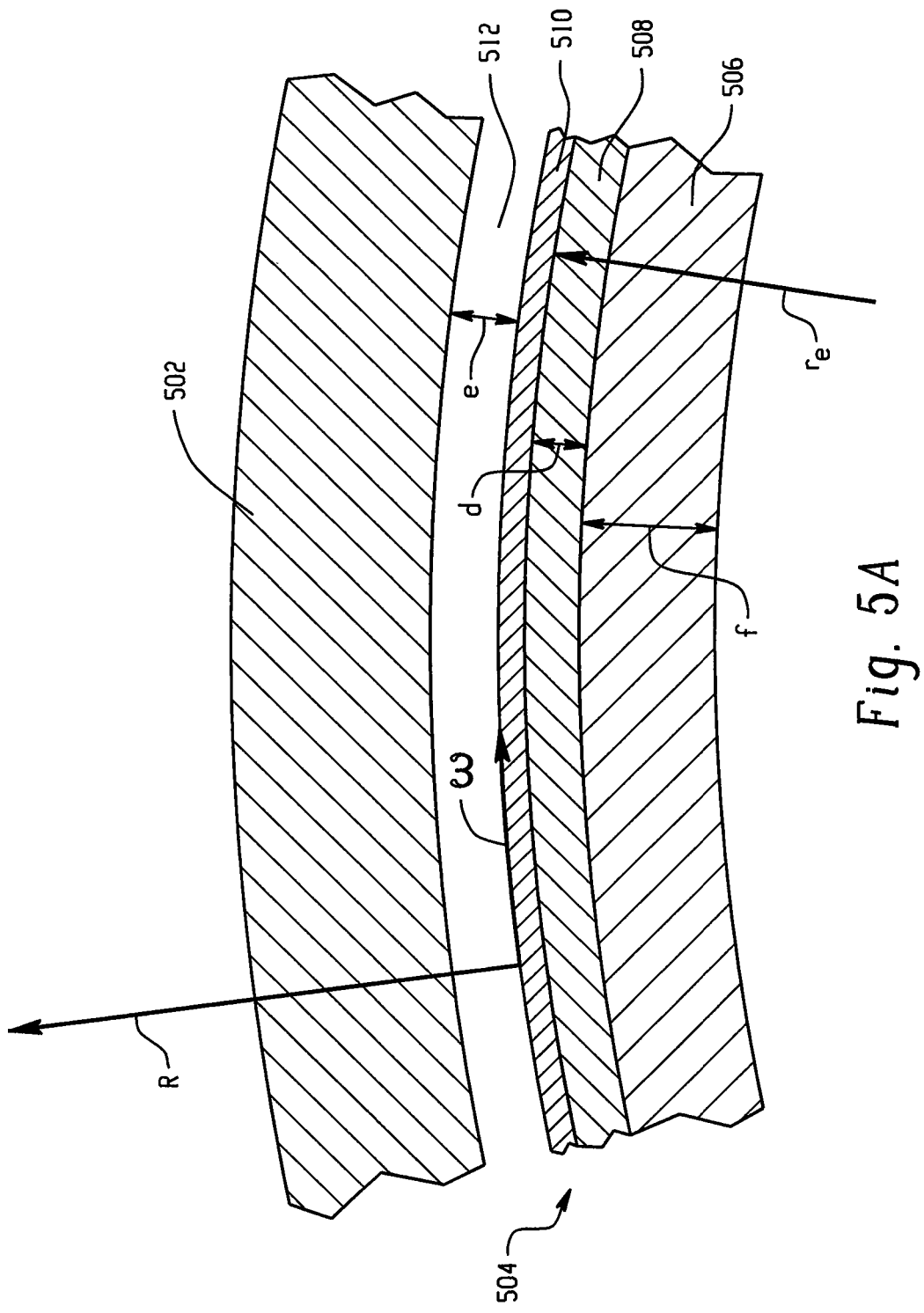
FIGS. 5A and 5B are cross-section diagrams depicting a layered implementation of a spherical rotor and a curved inductor of a spherical induction motor.

FIG. 5A is a cross-section diagram depicting a layered implementation of a spherical rotor and a curved inductor of a spherical induction motor. The outer (stator) layer 502 includes the plurality of curved inductors that rotate the spherical rotor 504 among any combination of three independent axes. In one example, the stator layer 502 has at least three uni-directional excitation sources (e.g., curved inductors) responsible for driving the spherical rotor 504 in three degrees of freedom. The inductors have a non-degenerate arrangement that also leaves a sufficiently large area of exposed rotor for contacting a surface (e.g., a floor). To first order, one can consider the inductors as sheet currents on the inner surface of the stator. The spherical rotor 504, of radius $r_e$, has a first, inner layer 506 of high magnetic permeability (such as Iron, Vanadium Permendur, 1010 alloy) of thickness f and a second, high electrical conductivity (such as Copper or Silver) layer 508 of thickness d. A traction or wear layer 510 covers the high conductivity layer 508. The composition of the traction or wear layer 510 may be selected to provide a sufficiently high level of friction with the contacting surface (e.g., the floor of FIG. 4) to avoid slipping. The traction or wear layer 510 may also protect the surface of the high electrical conductivity layer 508.

The spherical rotor 504 may be constructed in a variety of ways. For example, the inner permeable rotor layer 506 can be initially made as two hemispheres, which can be formed using a variety of processes such as machining, spin forming, deep drawing, and hyroforming. The two hemispheres can then be joined by processes such as brazing, welding, and adhesive fastening. The outer conductive rotor layer 508 can be formed by electrodeposition directly onto the surface of the inner permeable rotor 506 or can be formed as two hemispheres using a variety of processes such as machining, spin forming, deep drawing, and hyroforming. The hemispheres thus formed of conductive material can be applied to the inner permeable rotor and fastened by adhesive bonding, soldering, and brazing.

Figure 5B:
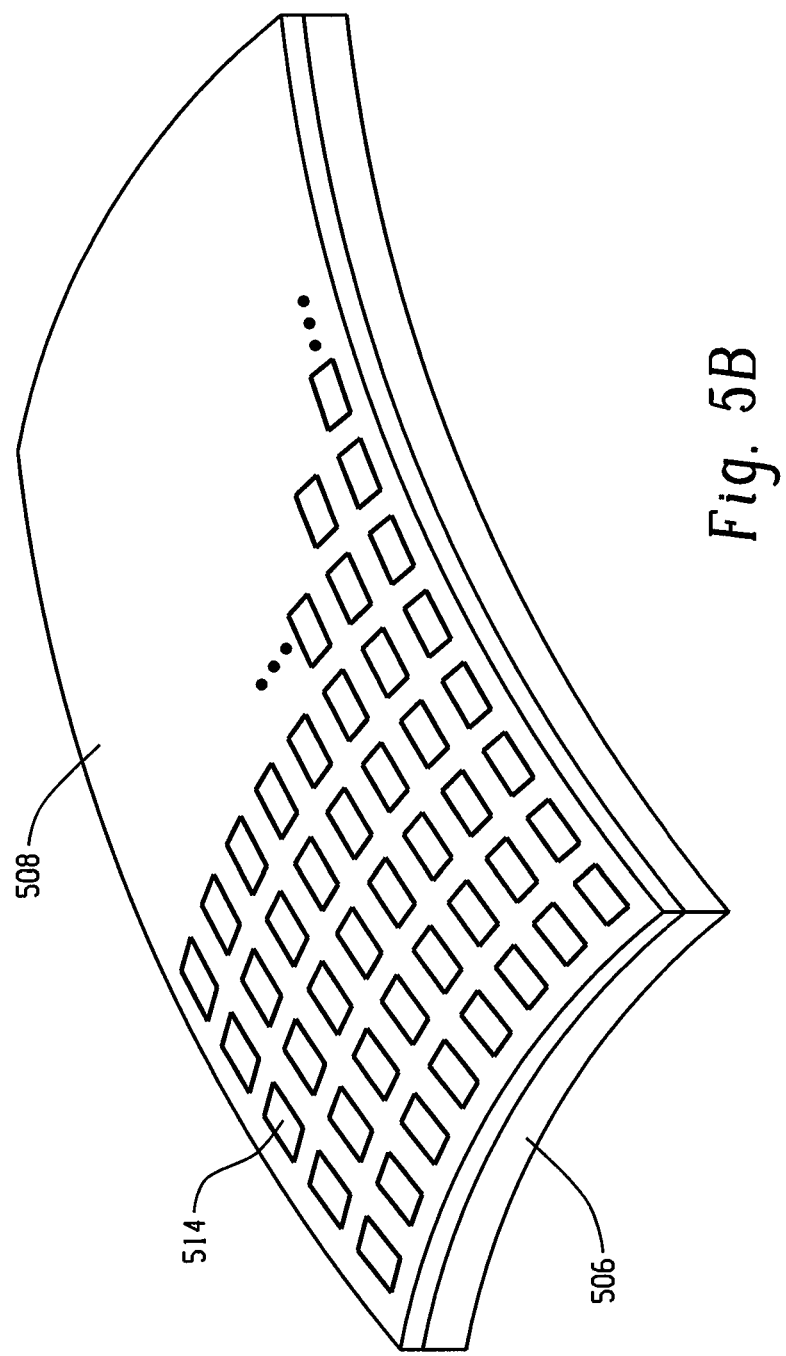

The hemispheres may be annealed before joining to maximize certain properties, such as magnetic properties. Additionally, as shown in FIG. 5B, the high conductivity layer 508 may include interspersions of a high magnetic permeability material 514 that extends through the high conductivity layer 508 and is in substantial magnetic contact with the inner layer 506. A traction or wear layer 510 may be applied to the outer conductive layer 504. The traction or wear layer 510 may be formed from a soft or hard material such as urethane or epoxy and may itself be interspersed with conductive particles, meshes, or strands.

The spherical rotor 504 and stator 502 are separated by an effective air gap 512 of thickness e which is maintained in a variety of ways (e.g., a mechanical bearing, an air bearing, a gas bearing, a ball bearing, a magnetic bearing, or other bearing system). Referring again to FIG. 5A, fields are measured with components parallel and transverse to the radial R, with rotor rotational velocity $\omega_{rot}$.

In one example, each of the inductors is wound with three sets of windings which are excited sinusoidally, differing 120 degrees in phase from one another causing a travelling magnetic wave to be induced in the permeable layer 506 of the rotor 504. The inductor core with p pole pairs has a number of slots s. For example, in one embodiment, there are s=3p+3 slots, p+1 for each phase (three), p poles inductor. The changing magnetic fields, in turn, generate reactive currents in the conductive layer 508 producing torque. Under the assumptions that fields are concentrated in the air gap 512, currents in the inductors can be treated as sheet currents at the interface between the stator inductor 502 and the air gap 512, negligible fringing fields, and linear and infinitely permeable inductor material, analytical modeling may be used to derive the rotor torque from the magnetic diffusion equation $$\frac{\nabla^2 \vec{A}}{\mu\sigma} = \frac{\partial \vec{A}}{\partial t} - \omega_{rot} r_e \times \nabla \times \vec{A} \tag{1}$$

where $\vec{A}$ is the magnetic vector potential, μ is the rotor Iron 506 permeability, σ is the rotor conductive 508 conductivity, $\omega_{rot}$ is the rotor angular velocity, and $r_e$ is the rotor 504 radius. In the two-dimensional model of FIG. 5A, the vector potential $\vec{A}$ reduces to the radial component $$\vec{A} = A(r)\exp[j(\omega_{sup}t - p/r_e \theta_{re})] \tag{2}$$

where $\omega_{swp}$ is the inductor excitation frequency, p is the number of inductor pole pairs, $\theta r_e$ is the circumferential distance along the rotor 504, and $\hat{r}$ is a unit vector in the radial direction. The flux density $\vec{B}$ and field strength $\vec{H}$ can then be determined from $$\vec{B} = \nabla \times \vec{A} \tag{3}$$

and the constitutive relationship $$\vec{B} = \mu\vec{H} \tag{4}$$

Boundary conditions may be applied to each layer shown in FIG. 5A. The field intensity $\vec{H}$ equals zero in the stator layer 502 and also at R equals zero. Between adjacent layers i and i+1, $$\hat{r} \times (\vec{H}_i - \vec{H}_{i+1}) = \vec{j} \tag{5}$$

and $$\hat{r} \cdot (\vec{B}_i - \vec{B}_{i+1}) = 0 \tag{6}$$

where $\vec{j}$ is the surface current on the stator 502.

The torque dτ per unit surface dS can be found by evaluating the Maxwell stress tensor on the rotor 504 surface:

$$d\tau = r_e \mu_0 H_\omega H_R dS \tag{7}$$

where $H_\omega$ and $H_R$ are the azimuthal and radial magnetic field components in the air gap and $\mu_0$ is the permeability of free space. The total torque is obtained by integration over the surface of the inductor, and has the form $$\tau = p \cdot S \cdot (N \cdot I_1)^2 \cdot r_e \cdot g(\mu, \sigma, \omega_{rot}, \gamma, e, d) \tag{8}$$

where S is the inductor surface area, $N \cdot I_1$ is the ampere-turns of impressed excitation, γ is the slip ratio $1-(\omega_{rot}/\omega_{sup})$ between the rotor speed and magnetic field speed, and g is a complicated nonlinear function. Note the squared dependence on stator current $I_f$ and the cubic dependence on the radius $r_e$ due to the fact that S can scale as $r_e^2$.

Figure 6:
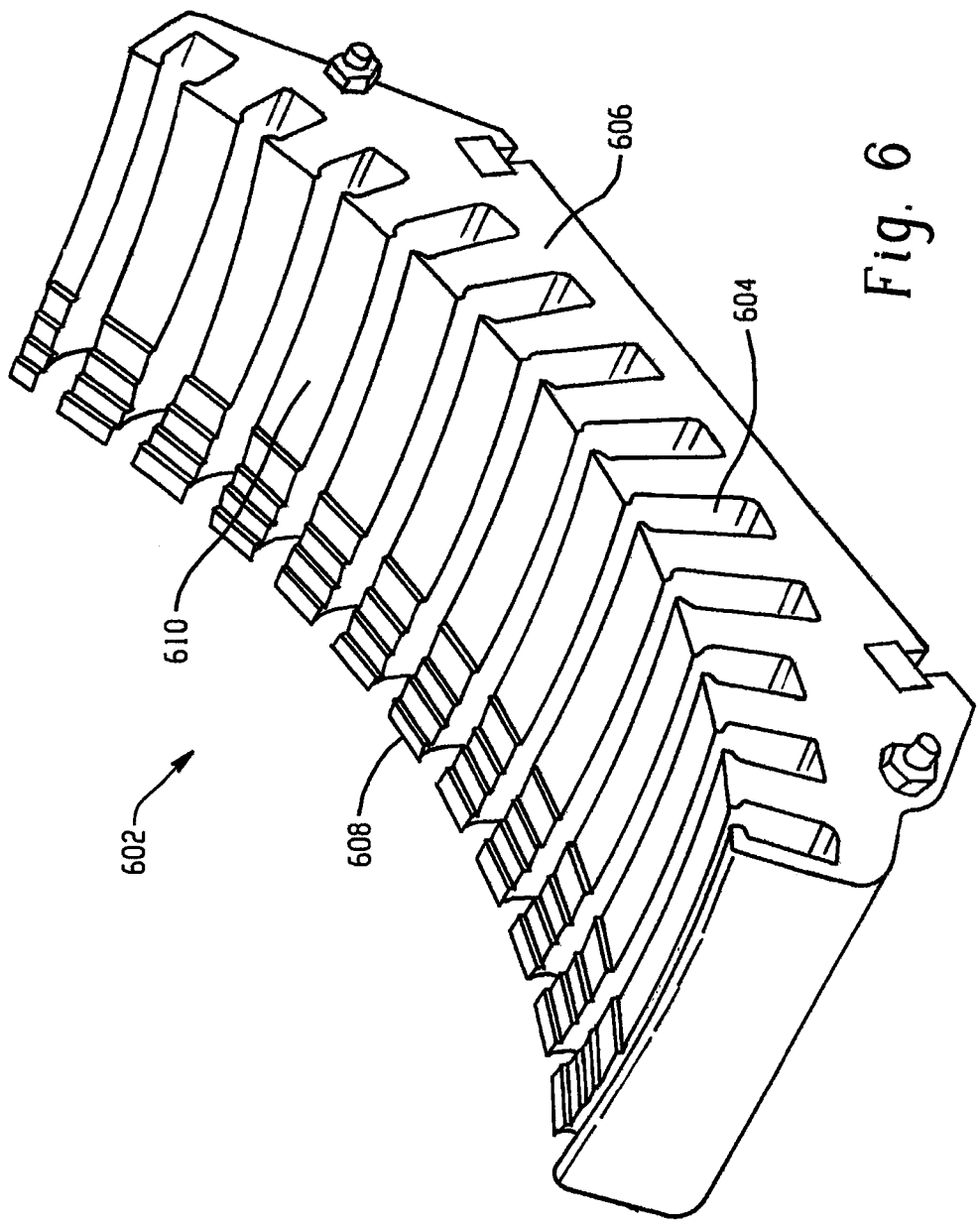
FIG. 6 depicts an example lamination structure of a curved inductor.

FIG. 6 depicts an example base structure of a curved inductor. The curved inductor 602 is formed from a plurality of laminations (layers) joined face to face. The curved inductor 602 includes a number of spaces (slots) 604 within which wire windings are placed. Currents are applied to the windings and are varied in magnitude and frequency to apply a travelling magnetic wave to a spherical rotor, as described in further detail below. The slots 604 are defined by a number of teeth 606 that support the windings and provide structure to the curved inductor 602 as well as creating magnetic circuits and strengthening magnetic field intensity. The teeth 606 may be formed of a variety of materials such as Silicon Iron or Vanadium Permendur. The individual laminations may be of uniform shape. Alternatively, the individual laminations may be varied in shape to better conform to the shape of the spherical rotor and better transmit the travelling magnetic wave to the spherical rotor. For example, the laminations depicted in FIG. 6 are of consistent width and are positioned parallel to one another. However, the heights of the teeth of the laminations are skewed relative to one another, such that the teeth on the outside laminations 608 are taller than the teeth on the inside laminations 610, giving the curved inductor a substantially spherical shape that can be juxtaposed with the spherical rotor. The curved inductor may also be formed from a single piece of material. Curved inductors can be tapered by grinding or other machining to provide a substantially spherical surface. Insulating material (e.g., thin plastic adhesive sheets) may be applied to the outside of an assembled set of laminations to provide insulation and protection of windings.

Figure 7C:
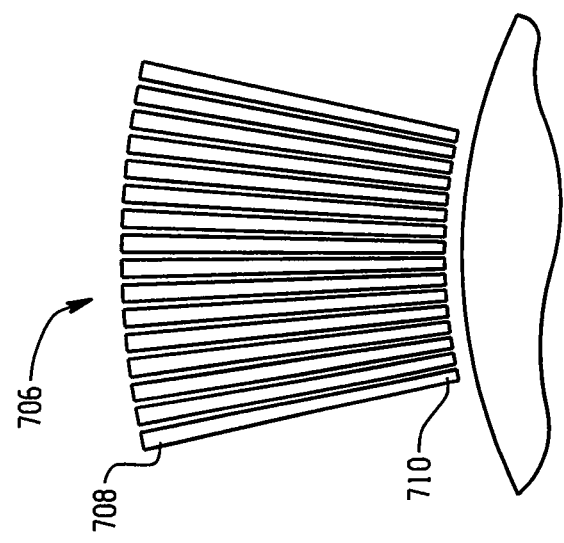
FIGS. 7A-C depict additional configurations for laminations of a curved inductor.
Figure 7B:
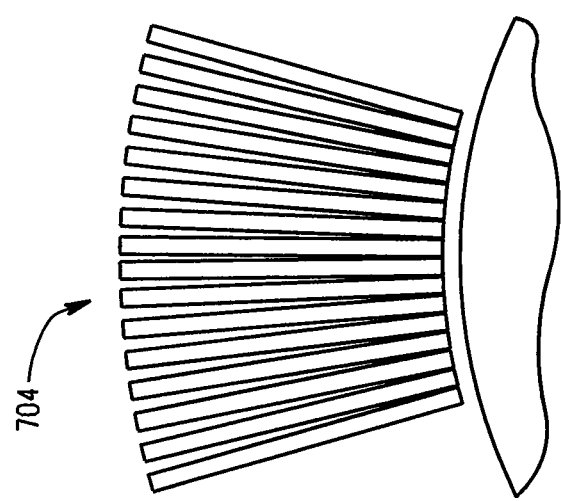
Figure 7A:
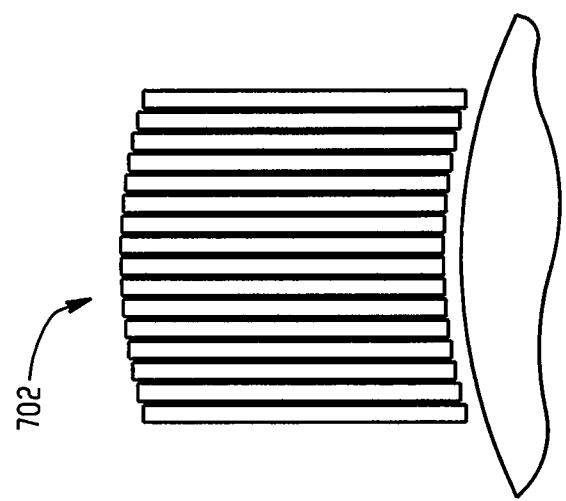

FIG. 7 depicts additional configurations for laminations of a curved inductor. The inductor lamination scheme at 702 is similar to the scheme depicted in FIG. 6, where the laminations are of consistent width and positioned parallel to one another at skewed heights on the rotor side relative to one another. The inductor lamination scheme at 704 is a radial stacking scheme where the laminations are of consistent width and positioned in a radial fashion relative to the spherical rotor. The inductor lamination scheme at 706 is a tapered scheme where the laminations are of tapered width (e.g., the top 708 of the laminations is thicker than the bottom 710 of the laminations). The torque force and power loss of a curved inductor tends to increase with the square of the driving current, where torque peaks at a certain optimal frequency. Torque may increase with tooth width and may decrease with tooth height beyond a particular threshold. Torque tends to decrease with air gap length.

Figure 8:
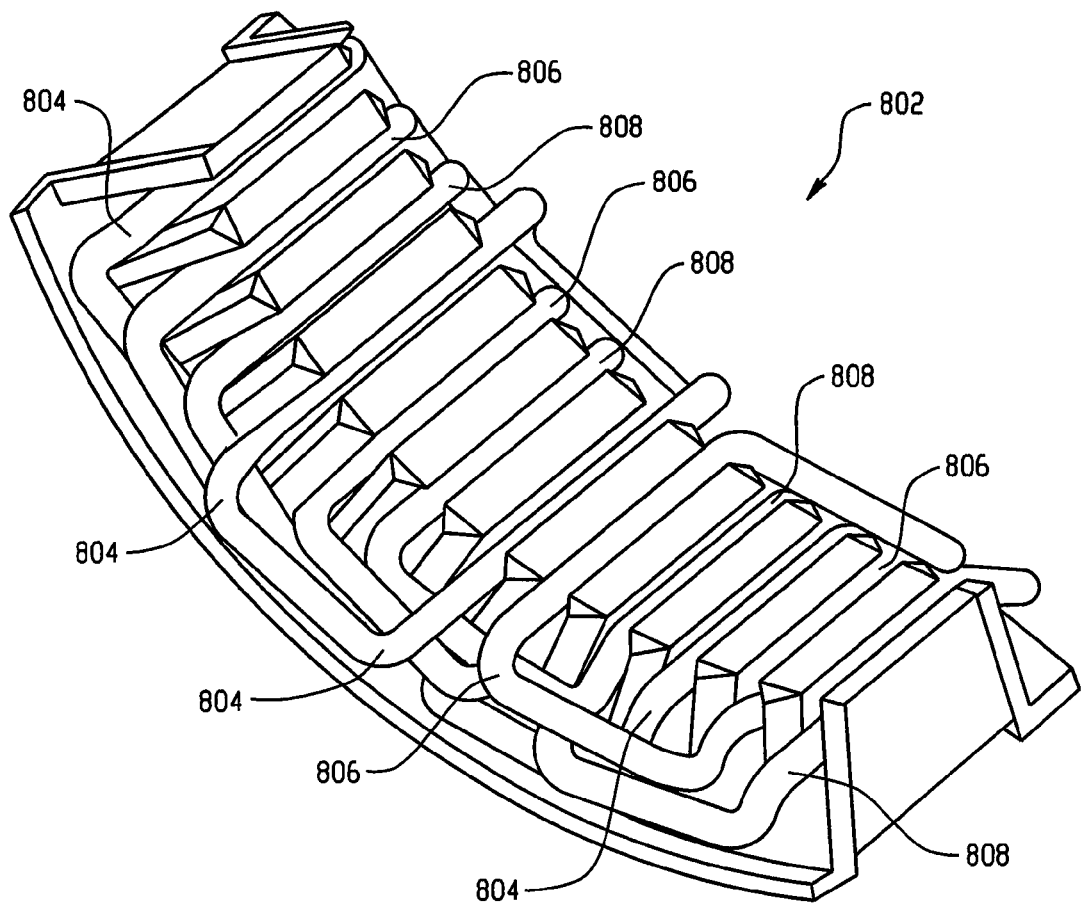
FIG. 8 depicts an example curved inductor having wire windings positioned in the slots between the teeth of the inductor.

FIG. 8 depicts an example curved inductor having wire windings positioned in the slots between the teeth of the inductor. In one example, the curved inductor 802 is interspersed with three sets of winding loops 804, 806, 808. The winding loops 804, 806, 808 are repeated along the length of the curved inductor. Electric currents are applied to the three winding loops 804, 806, 808 to control the travelling magnetic wave that is applied to the spherical rotor. Such currents may be applied independently in one example. In another example, the magnitude and frequency applied to the winding loops 804, 806, 808 may be varied, where the currents applied to the winding loops 804, 806, and 808 are applied 120 degrees out of phase with one another to produce the travelling magnetic wave.

Figure 9:
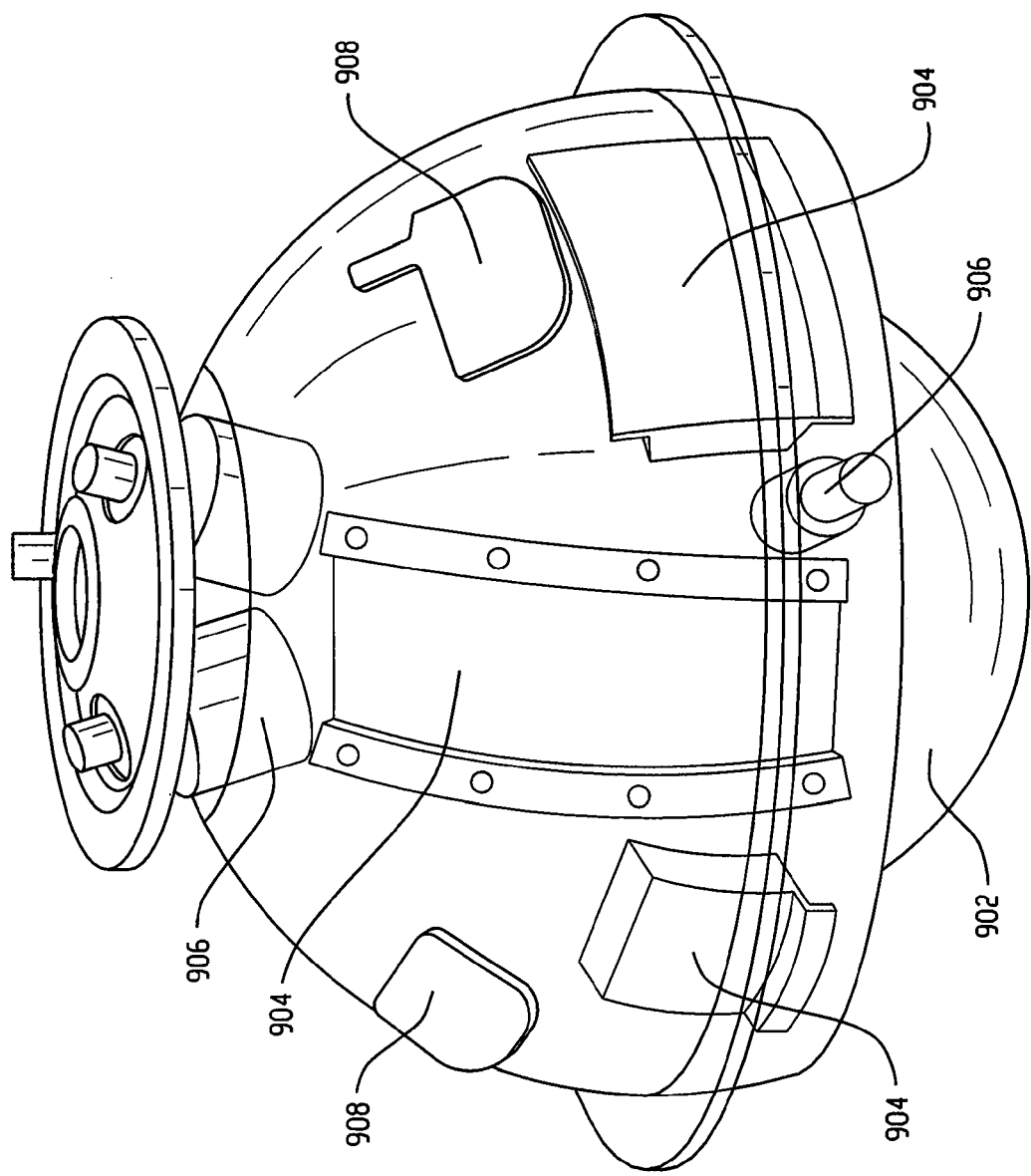
FIG. 9 is a diagram depicting an example implementation of a spherical induction motor.
Figure 10:
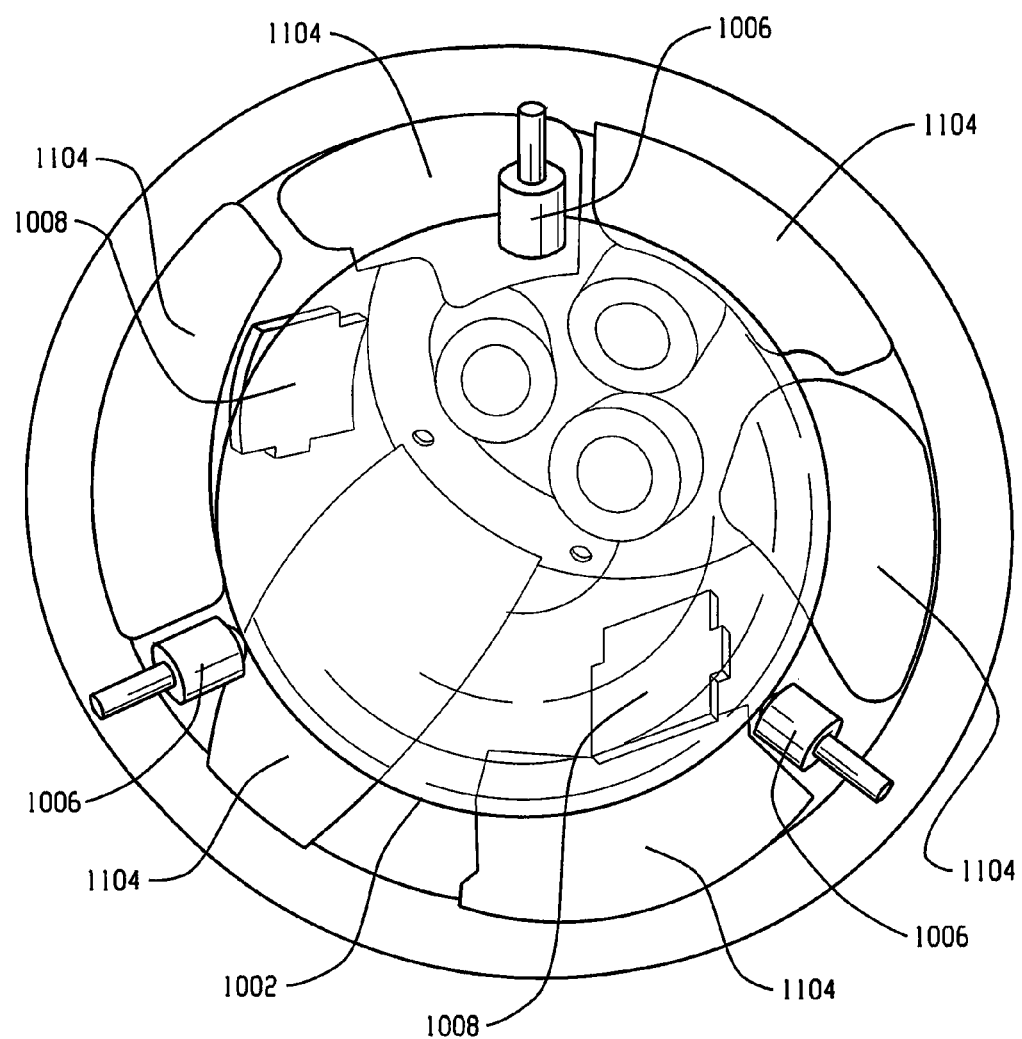
FIG. 10 is a bottom view of a spherical induction motor including a spherical rotor, inductors, bearings, and velocity sensors.
Figure 11:
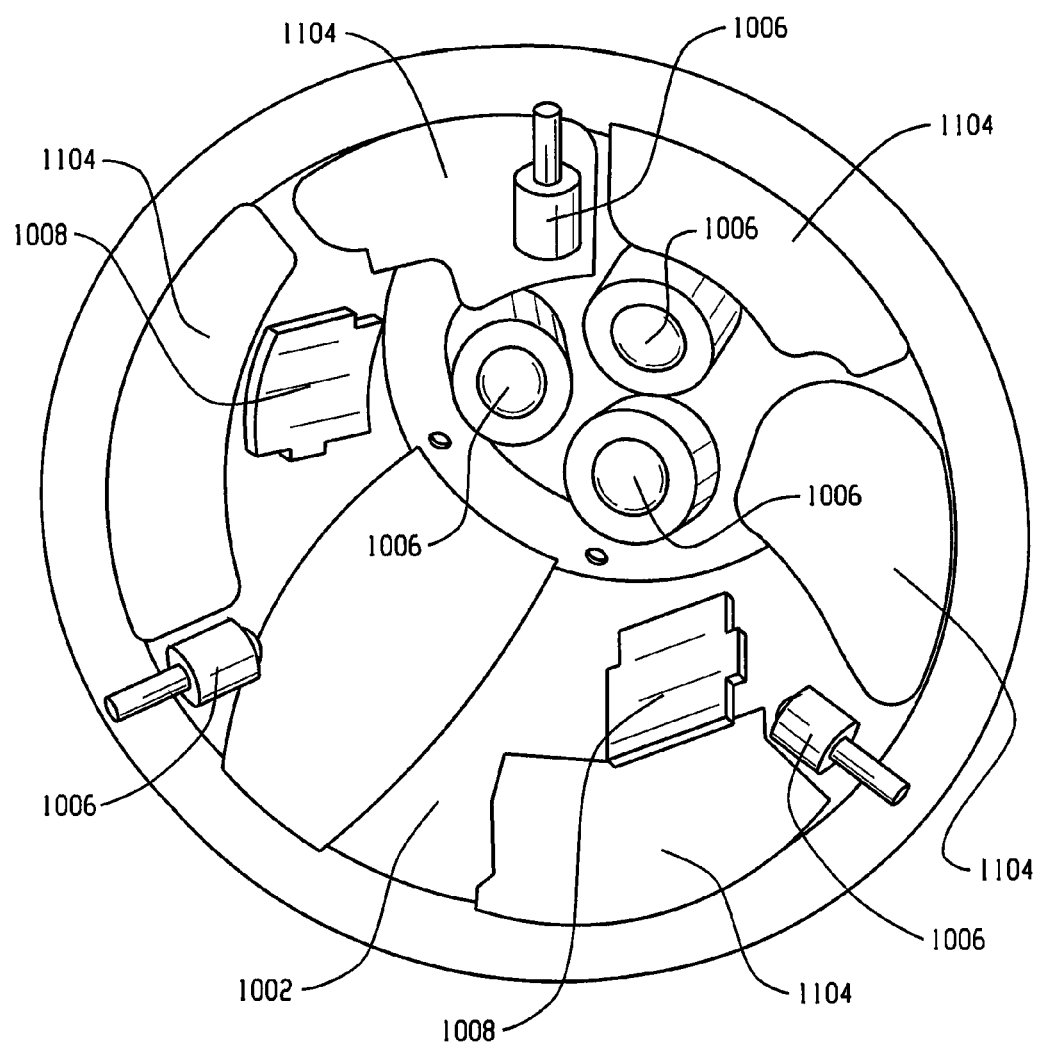
FIG. 11 is a bottom view of a spherical induction motor without a spherical rotor that includes inductors, bearings, and velocity sensors.

FIG. 9 is a diagram depicting an example implementation of a spherical induction motor. A spherical induction motor includes a spherical rotor 902 positioned within a plurality of curved inductors 904 that rotate the spherical rotor 902 continuously among any combination of three independent axes. A plurality of bearings 906 (e.g., mechanical bearings, air bearings, gas bearings, ball bearings, magnetic bearings) provide a gap between the spherical rotor 902 and the spherical induction motor, enabling the spherical rotor 902 to rotate. The spherical induction motor may further include one or more velocity sensors 908 that are configured to measure a velocity of rotation of the spherical rotor 902. The velocity sensors 908 may transmit a signal representative of the measured velocity to a processor. The processor considers the signals from the velocity sensors, any commanded movement of the spherical induction motor, and/or other inputs in commanding the variation of the magnitudes and frequencies of the currents transmitted to the curved inductors to control rotation of the spherical rotor. FIG. 10 is a bottom view of a spherical induction motor including a spherical rotor 1002, inductors 1004, bearings 1006, and velocity sensors 1008. FIG. 11 is a bottom view of a spherical induction motor without a spherical rotor that includes inductors 1104, bearings 1106, and velocity sensors 1108.

It may be desirable to measure the three-dimensional rotational velocity of the rotor for at least three reasons: i) to determine the optimal current and drive frequency at any instant in time (as described herein below); ii) to provide virtual damping for rotor control in the presence of external torques; and iii) to provide an odometry reference for travel along a surface such as the floor. Because, in some implementations, there are no shafts attached to the spherical rotor, it may not be possible to use encoders for sensing motion. Thus, an "axis independent" method for measuring rotation may be used to measure such motion. Such a method can employ optical, capacitive, inductive, or other principles. An optical velocity sensor may be implemented in a variety of forms. In one implementation, an optical velocity sensor uses optical mouse sensors (e.g., 2 or more) that measure surface velocity in two orthogonal directions by tracking patterns of small optical features such as texture or scratches. By using more than 2 velocity sensors, the signal-to-noise ratio of the velocity measurement can be improved by averaging multiple outputs in generating three degree of freedom angular rates and rotation angles. An optical velocity sensor can use light emitting diodes as light sources and are good at detecting slower motion at low resolutions. Higher cost velocity sensors (e.g., using laser or gaming mouse components) utilize laser diodes as light sources, resulting in higher precision at higher speeds (e.g., 5 µm resolution and 3.8 m/s, with processing rates of 12,000 frames/s.

FIG. 12 is a cross-section diagram of a spherical rotor that includes a pattern on the traction or wear layer to improve velocity sensing. A layer of high magnetic permeability 1202 is positioned within a layer of high electrical conductivity 1204. A traction or wear layer 1206 is positioned outside of the layer of high electrical conductivity 1204 on the spherical rotor. The traction or wear layer 1206 includes an incorporated pattern 1208 (e.g., a pattern of contrasting colors, shadings, lines) that enhances sensing by a velocity sensor. For example, the pattern may be a visual pattern that enhances detection of velocity by an optical scanner. As another example, the pattern may be mechanically embossed on the traction or wear layer 1206 to facilitate inductive or capacitive sensing.

Figure 13A:
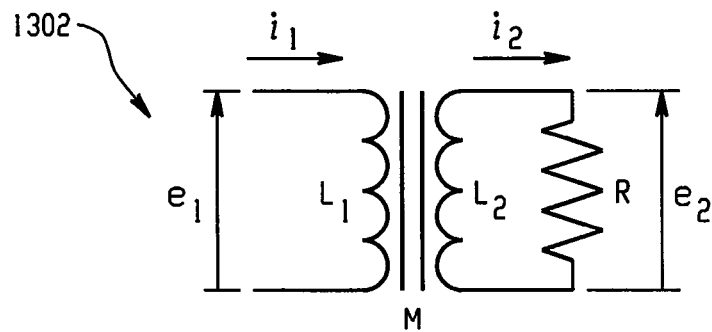
FIGS. 13A-C depict electrical models for implementing control systems for a spherical induction motor.
Figure 13B:
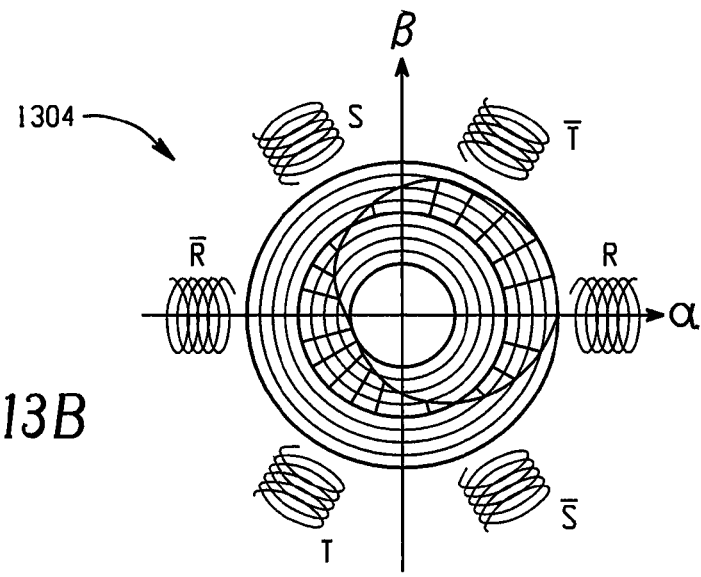
Figure 13C:
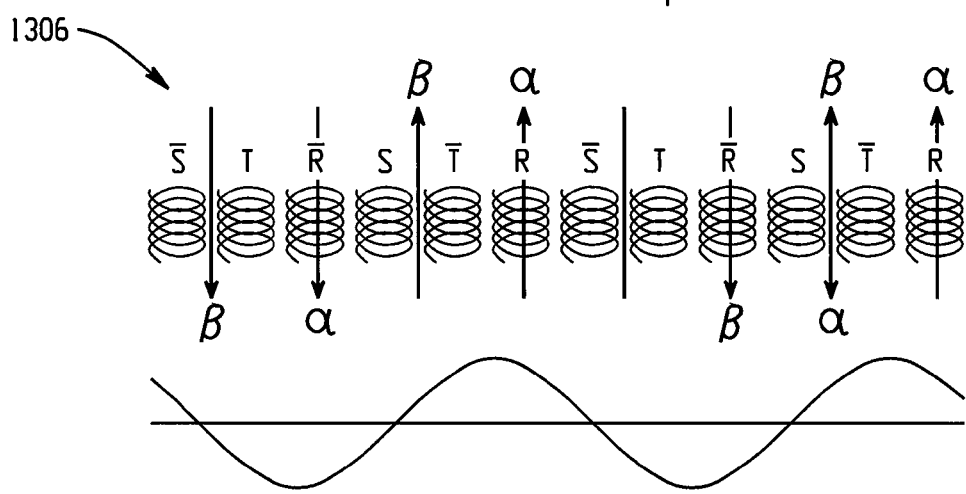

Control systems for implementing a spherical induction motor may be realized using a vector control scheme. High-speed processors and MOSFET and IGBT power devices aid in making such schemes practical. A variety of approaches can be used in implementing a control system for a spherical induction motor. For example, FIG. 13 depicts at 1302 a transformer model, where an impressed voltage $e_1$ generates an electromotive force $e_2$ through primary and secondary inductances $L_1$ and $L_2$ whose mutual inductance is M. The load R accounts for the output work and resistive (eddy current) losses. As shown at 1304, three-phase windings R, S, and T, with reverse windings $R_{bar}$, $S_{bar}$, and $T_{bar}$, generate a rotating field in the rotor, with respect to fixed orthogonal axes α and β, which lags behind the impressed field because of magnetic diffusion. FIG. 13 depicts at 1306 multiple sets of coils and their relationship with the rotating field vector whose components are expressed in the α-β frame fixed in the respective inductor. A Clarke transformation can be used to project the three phase drive quantities (voltages or currents) onto the α and β axes.

Figure 14C:
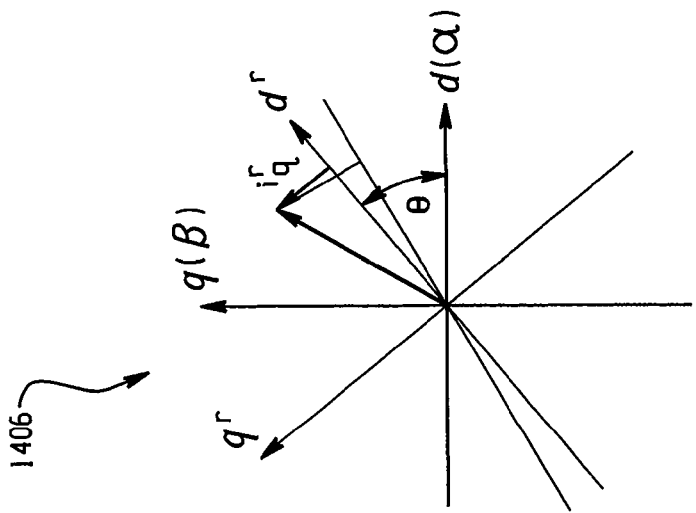
FIGS. 14A-C depict estimations of the magnetization axis corresponding to the unknown rotor current vector.
Figure 14B:
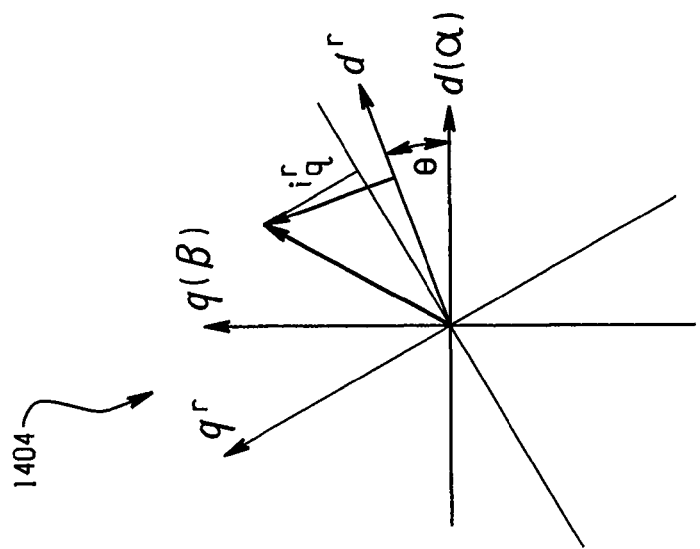
Figure 14A:
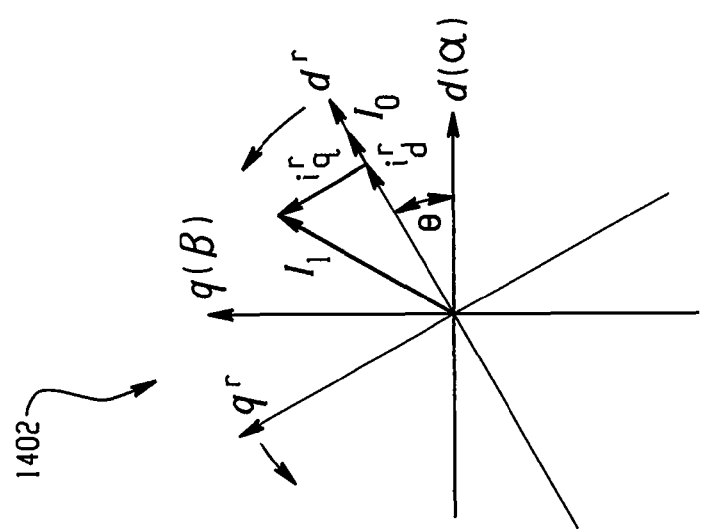

The frame of the rotating field may be denoted by the direct (d) and quadrature (q) orthogonal axes in both the inductor and rotor as shown in the diagram of FIG. 14. FIG. 14 depicts estimations of the magnetization axis corresponding to the unknown rotor current vector. The inductor current $i_d = i_R$ and $i_q = (1/\sqrt{3})(i_S - i_T)$. Because $i_R + i_S + i_T = 0$, this reduces to:

$$i_d = i_R \quad (9)$$

and $$i_q = (1/\sqrt{3})i_R + (2/\sqrt{3})i_S \quad (10)$$

By using current sensors (e.g., Hall sensors) on only two of the phase currents (e.g., $i_R$ and $i_S$) one can determine the d and q components of the currents in the inductor frame. A Park transformation can be used to obtain the $i_d$ and $i_q$ currents in the rotating frame of the rotor:

$$i_d^r = i_q \sin \theta_r + i_d \cos \theta_r \quad (11)$$

$$i_q^r = i_q \cos \theta_r - i_d \sin \theta_r \quad (12)$$

where $\theta_r = \theta_0 + \omega t$, and ω is the angular velocity of the rotating flux.

The torque exerted on the rotor is the product of the d and q currents in the rotating frame:

$$\tau = K_T i_d^r i_q^r \quad (13)$$

By controlling these two currents at any instant, the torque can be directly controlled. However, $i_d^r$ and $i_q^r$ may not be directly measurable. However, in some instances they can be estimated. FIG. 14 at 1402 depicts the d-q frame rotating with respect to the stationary α-β frame with the direction of maximum rotor flux indicated by the vector $I_1$ having components $i_d^r$ and $i_q^r$ along the d and q axes, respectively.

Figure 15:
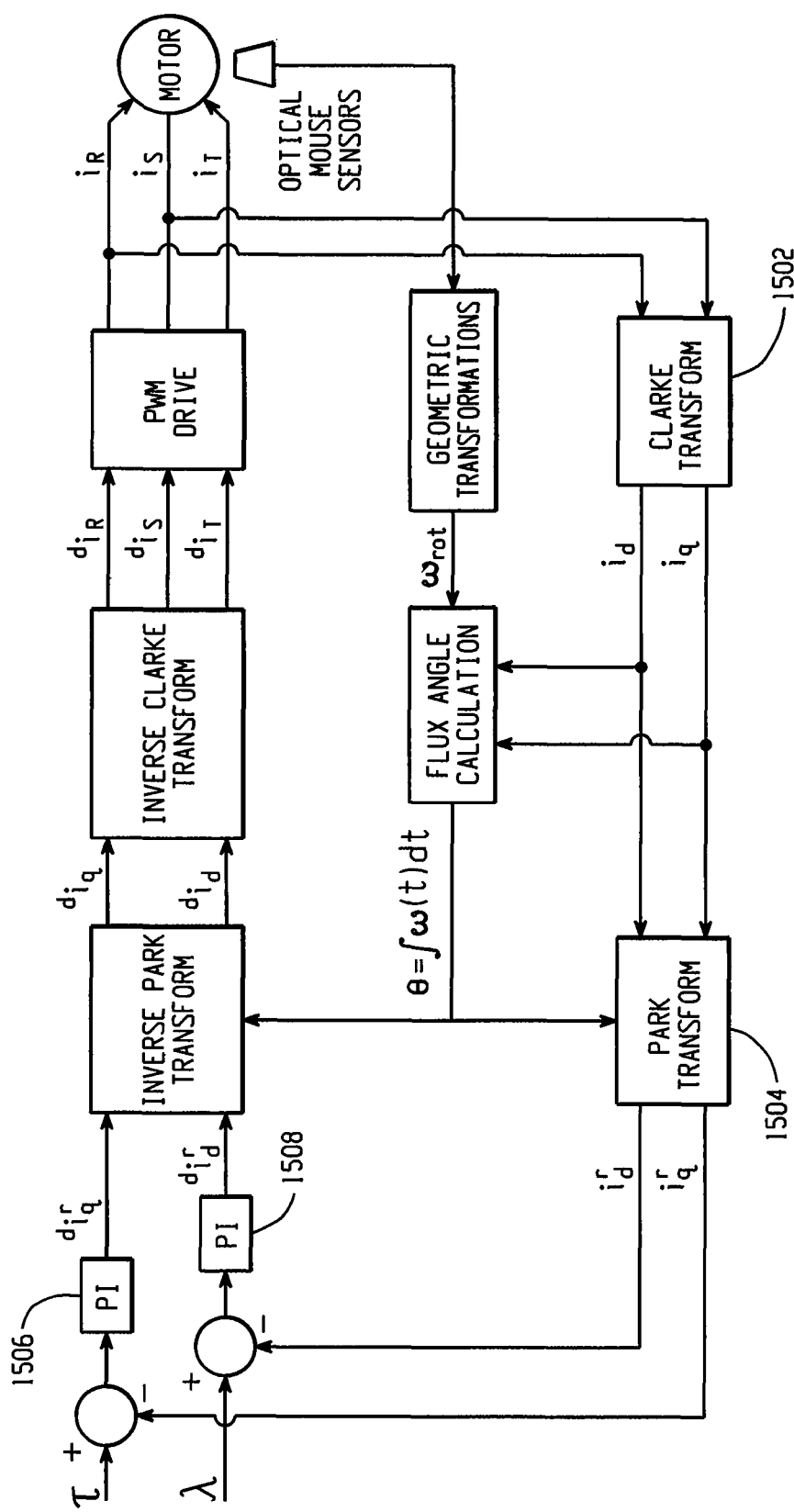
FIG. 15 is a block diagram depicting a closed-loop feedback scheme controlling each inductor.

With reference to the transformer model depicted in FIG. 14 at 1402, the angular frequency of ω of the rotating flux vector is $$\omega(t) = \frac{L_2}{R} \frac{i_q^r}{I_0} \quad (14)$$

where $I_0$ is the magnitude of the rotating flux vector along the dr-axis. The angle θ can be generated by numerically integrating Equation 14. The quantity $L_2/R$ can be estimated. Thus, in one implementation, the closed-loop feedback scheme depicted in FIG. 15 is implemented. Here, measured currents, $i_R$ and $i_S$, from two phases of the pulse width modulation (PWM) drive are transformed by the Clarke block 1502 and combined with rotor angular speed $\omega_{rot}$ measurements from the proposed optical velocity sensor to estimate the rotor flux angle θ. This is equivalent to measuring the slip ratio γ. The Park transform 1504 obtains the rotating frame currents followed by proportional-integral (PI) controllers 1506, 1508 that compute the desired currents $^di_d^r$ and $^di_q^r$ from the commanded torque τ and flux λ is proportional to $I_0$, respectively. FIGS. 14 at 1404 and 1406 illustrates cases where the estimated flux angle lags behind or moves ahead of the correct angle, respectively. In either case, the closed-loop scheme will tend to converge rapidly to the correct value.

Figure 16:
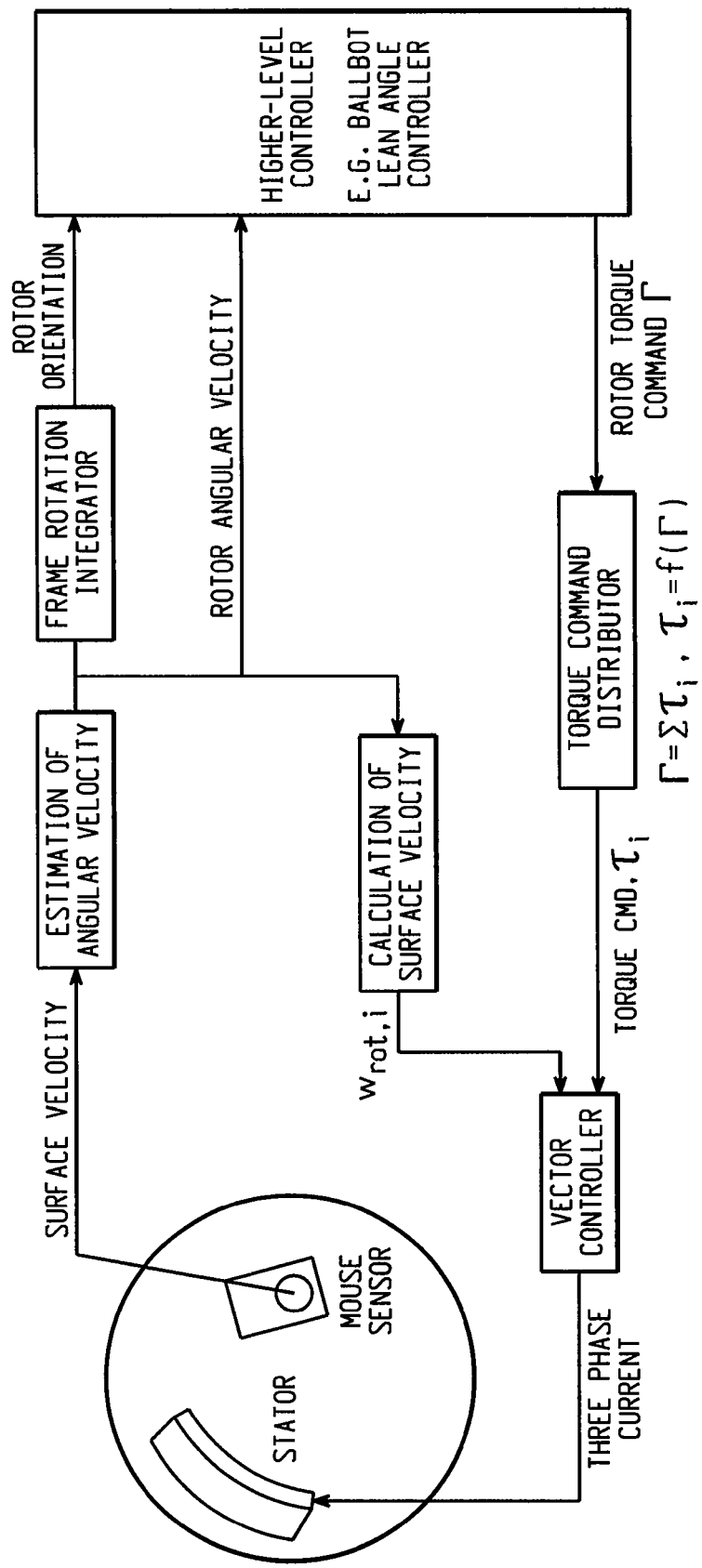
FIG. 16 is a block diagram depicting an example spherical induction motor control scheme combined with ball rotation sensing and vector drivers that includes a higher-level controller.

The closed-loop scheme of FIG. 15 can be implemented for each independent set of inductors surrounding the rotor. The number of controllers implemented may depend on the number and configuration of inductors. Additional higher-level controllers can be implemented in some scenarios (e.g. in a ballbot) to compute the correct instantaneous rotor torque $\vec{\Gamma} = \Sigma_i^n=1 \, \vec{\tau}_i$, where n is the number of independent inductor sets. For balancing in one place, $\vec{\Gamma}$ may change rapidly in magnitude and direction to counter environmental disturbances. For moving from place to place, the torque $\vec{\Gamma}$ can be used by a higher-level controller to establish a body lean angle proportional to the desired acceleration. FIG. 16 is a block diagram depicting an example spherical induction motor control scheme combined with ball rotation sensing and vector drivers that includes such a higher-level controller.

Examples have been used to describe the invention herein, and the scope of the invention may include other examples. For example, velocity may be sensed according to the following sensing process. Usually, an optical mouse sensor has two sensing axes. There are assumed to be two independent surface velocity sensors in one mouse sensor (whose position is identical but sensing direction are perpendicular to each other).

Let the position of the sensor i (i=1 ... n) be $p_i$ and unit vector of sensing axis $s_i$. When the sphere rotates with angular velocity ω, surface velocity at $p_i$ is $$v_i = \omega \times p_i$$

The sensor can sense the relative speed along $s_i$.

$$v_{si} = s_i \cdot v_i = s_i \cdot (\omega \times p_i) = \omega \cdot (p_i \times s_i)$$

Using three sensors, numbered 1, 2, and 3, the equation can be written as:

$$\begin{pmatrix} v_{s1} \\ v_{s2} \\ v_{s3} \end{pmatrix} = \begin{pmatrix} p_1 \times s_1 \\ p_2 \times s_2 \\ p_3 \times s_3 \end{pmatrix} \begin{pmatrix} \omega_x \\ \omega_y \\ \omega_z \end{pmatrix} = S\omega$$

This equation can be solved when the matrix S is a regular matrix, and the angular velocity can be derived using the surface speed sensor.

$$\begin{pmatrix} \omega_x \\ \omega_y \\ \omega_z \end{pmatrix} = S^{-1} \begin{pmatrix} v_{s1} \\ v_{s2} \\ v_{s3} \end{pmatrix}$$

From n sensors, triplets can be chosen of $_nC_3 = n!/(3!(n-3)!)$, while better triplets having a larger |S| are subsequently chosen. The angular velocity can then be calculated, and an average of all triplets provides angular velocity with a better signal to noise ratio (e.g., using a weighted mean).

As a further example, torques can be generated using the following equations. Let the position of inductor i be $p_i$ and unit vector of force generating direction (tangent of the rotor) $s_i$. The torque generated by inductor i is expressed by $$\tau_i = p_i \times (f_i s_i)$$

where $f_i$ is an output command (scalar) for inductor i.

Assuming n inductors, the total generated torque can be calculated according to:

$$\Gamma = \sum_{i=1}^{n} \tau_i = \sum_{i=1}^{n} (p_i \times s_i) f_i$$

Letting the outer product $p_i \times s_i$ be a vector $t_i = (t_{ix}, t_{iy}, t_{iz})^T$, the above equation can be written in matrix form as:

$$\begin{pmatrix} \Gamma_x \\ \Gamma_y \\ \Gamma_z \end{pmatrix} = \begin{pmatrix} t_{1x} & \cdots & t_{nx} \\ t_{1y} & \cdots & t_{ny} \\ t_{1z} & \cdots & t_{nz} \end{pmatrix} \begin{pmatrix} f_1 \\ \vdots \\ f_n \end{pmatrix} = Tf$$

where T and f are a matrix that consists of $t_i$ and a vector of $f_i$.

Solving this equation, command $f_i$ for each current drive controller can be determined from the desired torque $\Gamma$. If n=3 and $t_1$, $t_2$, and $t_3$ are linearly independent, then the equation can be solved:

$$\begin{pmatrix} f_1 \\ f_2 \\ f_3 \end{pmatrix} = T^{-1} \begin{pmatrix} \Gamma_x \\ \Gamma_y \\ \Gamma_z \end{pmatrix}$$

If n>3 and the rank of T is three, $f_i$ can still be defined by one of two methods. First, the pseudo inverse matrix (or similar technique) can be used to solve the equation:

$$\begin{pmatrix} f_1 \\ \vdots \\ f_n \end{pmatrix} = T^{+} \begin{pmatrix} \Gamma_x \\ \Gamma_y \\ \Gamma_y \end{pmatrix}$$

where $T^{+}$ is the pseudo inverse matrix of T. Second, one can choose only three major inductors out of n and use the above equation inverse to decide three $f_i$ (or choose less than n and use the pseudo inverse). This solution can decrease power consumption for magnetizing but may result in lag when switching operating inductors.

As another example, the methods and systems described herein may be implemented on many different types of processing devices by program code comprising program instructions that are executable by the device processing subsystem. The software program instructions may include source code, object code, machine code, or any other stored data that is operable to cause a processing system to perform the methods and operations described herein and may be provided in any suitable language such as C, C++, JAVA, for example, or any other suitable programming language. Other implementations may also be used, however, such as firmware or even appropriately designed hardware config-ured to carry out the methods and systems described herein. The systems' and methods' data (e.g., associations, mappings, data input, data output, intermediate data results, final data results, etc.) may be stored and implemented in one or more different types of computer-implemented data stores, such as different types of storage devices and programming constructs (e.g., RAM, ROM, Flash memory, flat files, databases, programming data structures, programming variables, IF-THEN (or similar type) statement constructs, etc.). It is noted that data structures describe formats for use in organizing and storing data in databases, programs, memory, or other computer-readable media for use by a computer program.

The computer components, software modules, functions, data stores and data structures described herein may be connected directly or indirectly to each other in order to allow the flow of data needed for their operations. It is also noted that a module or processor includes but is not limited to a unit of code that performs a software operation, and can be implemented for example as a subroutine unit of code, or as a software function unit of code, or as an object (as in an object-oriented paradigm), or as an applet, or in a computer script language, or as another type of computer code. The software components and/or functionality may be located on a single computer or distributed across multiple computers depending upon the situation at hand.

It should be understood that as used in the description herein and throughout the claims that follow, the meaning of "a," "an," and "the" includes plural reference unless the context clearly dictates otherwise. Also, as used in the description herein and throughout the claims that follow, the meaning of "in" includes "in" and "on" unless the context clearly dictates otherwise. Further, as used in the description herein and throughout the claims that follow, the meaning of "each" does not require "each and every" unless the context clearly dictates otherwise. Finally, as used in the description herein and throughout the claims that follow, the meanings of "and" and "or" include both the conjunctive and disjunctive and may be used interchangeably unless the context expressly dictates otherwise; the phrase "exclusive or" may be used to indicate situation where only the disjunctive meaning may apply.

It is claimed:

1. An induction motor, comprising:
    a spherical rotor comprising a continuous layer of high electrical conductivity;
    an optical sensor configured to measure a surface velocity of the spherical rotor;
    a processor configured to provide closed loop control of angular velocity of the spherical rotor based on an angular velocity command and the measured surface velocity from the optical sensor; and
    a plurality of curved inductors positioned around the spherical rotor, wherein the plurality of curved inductors is configured to interact with the continuous high electrical conductivity layer to rotate the spherical rotor through arbitrarily large angles among any combination of three independent axes based on commands from the processor.

2. The motor of claim 1, wherein the curved inductors are configured to rotate the spherical rotor via varying currents applied to the inductors.

3. The motor of claim 2, wherein the processor is configured to vary a plurality of currents applied to a particular inductor, wherein the currents are varied in magnitude and frequency to induce a travelling magnetic wave in the spherical rotor.

4. The motor of claim 2, wherein the processor is configured to command a plurality of currents to be transmitted to each of the plurality of inductors, wherein the currents are varied in magnitude and frequency to induce a plurality of travelling magnetic waves to the spherical rotor from whence controlled torque is generated on the rotor according to any combination of the three independent axes.

5. The motor of claim 4, wherein the travelling magnetic waves are induced in the permeable layer of the rotor and reactive currents are generated in the conductive layer by alternatingly powering different sets of wire windings on a single curved inductor.

6. The motor of claim 1, wherein the spherical rotor comprises a first layer and a second layer, wherein the first layer is positioned inside of the second layer, wherein the first layer is a high magnetic permeability layer, and wherein the second layer is the high electrical conductivity layer.

7. The motor of claim 6, wherein the first layer includes iron or vanadium permendur, and wherein the second layer comprises copper or silver.

8. The motor of claim 6, wherein the second layer includes interspersions of a high magnetic permeability material in substantial magnetic contact with said first layer.

9. The motor of claim 6, wherein the spherical rotor is formed from two first layer hemispheres of a high magnetic permeability composition joined together, wherein a high electrical conductivity material is applied outside of the two hemispheres by electrodeposition or by fastening two second layer hemispheres of a high electrical conductivity composition around the two joined first layer hemispheres.

10. The motor of claim 6, wherein the spherical rotor includes a traction or wear layer that is positioned outside of the second layer.

11. The motor of claim 10, wherein the traction or wear layer is formed from nickel, urethane or epoxy.

12. The motor of claim 1, wherein the spherical rotor is separated from the plurality of inductors by a gap.

13. The motor of claim 12, wherein the gap is maintained by means selected from at least one of: a mechanical bearing, an air bearing, a gas bearing, a ball bearing, and a magnetic bearing.

14. The motor of claim 1, wherein one of the curved inductors comprises a plurality of laminations, wherein the laminations are interspersed with conductive windings.

15. The motor of claim 14, wherein the laminations comprise insulated silicon iron or vanadium permendur.

16. The motor of claim 14, wherein the laminations are of a configuration selected from the group consisting of:
    laminations of consistent width and positioned parallel to one another at skewed heights relative to one another;
    laminations of consistent width and positioned in a radial fashion relative to the spherical rotor; and
    laminations of a tapered width.

17. The motor of claim 14, wherein the laminations are interspersed with a plurality of conductive windings, wherein particular currents are applied to each of the windings to affect a travelling magnetic wave that is induced in the spherical rotor via the laminations, wherein the processor is configured to individually vary magnitudes and frequencies of currents applied to the windings to control the travelling magnetic wave.

18. The motor of claim 1, wherein two of the curved inductors are positioned orthogonally to one another.

19. The motor of claim 1, wherein the plurality of inductors are positioned askew relative to one another along or parallel to a great circle of the spherical rotor.

20. The motor of claim 1, wherein the plurality of inductors are positioned in a non-degenerate arrangement that enables application of torques in any of three axes.

21. The motor of claim 20, wherein the plurality of inductors are positioned in the non-degenerate arrangement that leaves a sufficiently large area of exposed rotor for contacting a surface.

22. The motor of claim 21, wherein the surface is a floor.

23. The motor of claim 1, wherein the motor is a component of a ballbot, a mobile robot, a wrist joint, a shoulder joint, an antenna positioner, a sensor, a detector, a wheelchair, or a camera.

24. The motor of claim 1, wherein the curved inductors face in juxtaposition with said rotor, and wherein the curved inductors have a substantially spherical surface.

25. The motor of claim 1, wherein closed loop control of the angular velocity of the spherical rotor comprises:
    controlling the angular velocity of the spherical rotor based on the velocity command and the measured rotor surface velocity from the optical sensor; and
    controlling an angular position of the spherical rotor based on the integration of the surface velocity measurement with respect to time.

26. The motor of claim 1, wherein the optical sensor is configured to measure the surface velocity of the spherical rotor by detecting a pattern on the spherical rotor and tracking relative motion of the pattern.

27. The motor of claim 26, wherein the pattern is a texture of an outside surface of the spherical rotor or scratches on the spherical rotor.

28. The motor of claim 1, wherein the spherical rotor is empty inside a volume defined by the spherical rotor.

29. The motor of claim 1, wherein providing the closed loop control includes determining a rotor angular displacement based on an integration operation performed using the measured surface velocity.

30. The motor of claim 1, wherein the plurality of curved inductors sit substantially above a floor on which the spherical rotor sits and are supported by the spherical rotor.

31. The motor of claim 1, wherein the curved inductors interact with a surface of high magnetic permeability and the high electrical conductivity layer.

32. A method of rotating a spherical rotor continuously among any combination of three independent axes, comprising:
    placing the spherical rotor, which comprises a continuous layer of high electrical conductivity, within a plurality of curved inductors, wherein each of the curved inductors includes a plurality of windings;
    detecting a surface velocity of the spherical rotor using an optical sensor;
    providing closed loop control of an angular velocity of the spherical rotor based on a command and the measured surface velocity from the optical sensor; and
    individually varying a magnitude and frequency of current applied to each of the windings of each of the curved inductors based on the closed loop control to interact with the continuous high electrical conductivity layer and to induce a travelling magnetic wave in the spherical rotor to rotate the spherical rotor through arbitrarily large angles among any combination of three independent axes based on commands from the closed loop control.

33. The method of claim 32, further comprising:
    optically measuring the surface velocity of the spherical rotor from whence the angular velocity of the rotor is determined;

receiving a command for a desired angular velocity of the spherical rotor; and altering the individually varied magnitudes and frequencies of currents based on the determined angular velocity to achieve the commanded angular velocity.

34. The method of claim 32, wherein the magnitudes and frequencies of currents are varied according to a control scheme, wherein the control scheme is a three-phase motor control scheme or a vector control scheme.

* * * * *